Sept. 20, 1932.   F. A. HOPPE   1,878,519

HUMIDIFIER FOR BAKE OVENS

Filed April 3, 1931

Inventor:
FRIEDRICH A. HOPPE

Patented Sept. 20, 1932

1,878,519

UNITED STATES PATENT OFFICE

FRIEDRICH A. HOPPE, OF CHICAGO, ILLINOIS, ASSIGNOR TO THE PETERSEN OVEN COMPANY, OF CHICAGO, ILLINOIS, A CORPORATION OF ILLINOIS

HUMIDIFIER FOR BAKE OVENS

Application filed April 3, 1931, Serial No. 527,412, and in Germany August 7, 1930.

My invention relates to bake ovens and has more particular reference to means for providing a steam, vapor, or humidifying chamber within the oven for the purpose of moistening or otherwise treating the loaves of dough therein. More specifically the structure I have devised consists of a chamber comprising one of a plurality of chambers and passages of a traveler tray oven in which there is a continuous conveyor that moves the shelves or trays containing the goods. In passing through this special chamber the trays themselves form retaining walls and assist in confirming the humidified atmosphere within the chamber.

It is generally the practice in bakery technique, to initially subject the loaves of certain kinds of dough to a moist hot atmosphere or hot vapor, such as steam, during the first run of the traveler for the purpose of conditioning the dough and thereafter to subject the goods to a drier heat for the purpose of baking. Pipes have been introduced into oven chambers to discharge steam into them while the dough is initially treated. The steam so discharged is not necessarily confined within the particular chamber but is dispersed, passing into the other or adjacent chambers or passages. In the present structure I have provided means for holding the steam or other humidifying medium at least temporarily within the particular chamber.

This I have done by providing a vertically disposed chamber at the front of the oven with its vertical walls permanently positioned so that their horizontal sectional proportions correspond substantially with the plan of each tray that passes upwardly through the chamber between said walls and the trays thus providing the top and bottom confirming walls of the chamber.

The vertical dimensions of the chamber are such that there is a plurality (two or more) of shelves or trays always within and passing through said chamber the one above the other. Steam or other moisture is passed through certain of the stationary walls and is discharged into the chamber so that the humidified atmosphere is moved upwardly through the chamber between two adjacent trays.

In devising this structure it is one of my objects to provide an apparatus that is simple and novel in construction, which is dependable in operation, which is effective in performing its functions, and which has practically no parts to get out of order. Further objects will be apparent to others after an understanding of my invention is had from the following detailed description.

I prefer to carry out my invention and to accomplish the numerous objects thereof in substantially the manner hereinafter fully described and as more particularly pointed out in the claims. Reference will now be made to the accompanying drawing, in which:—

Figure 1:
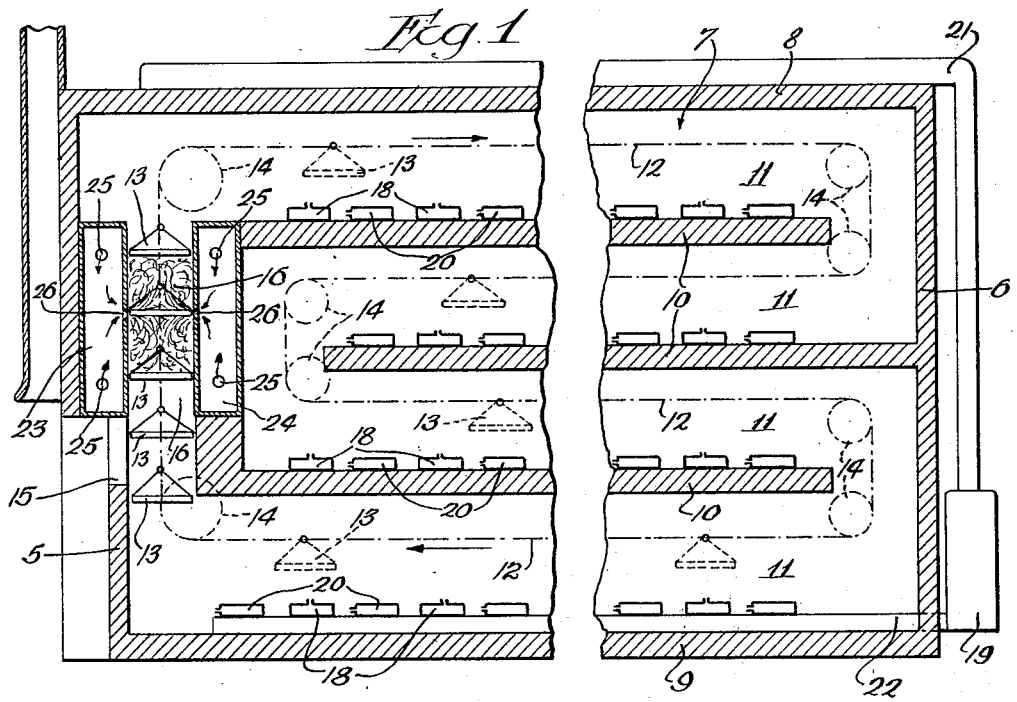
Figure 1 is a vertical longitudinal section of a typical bake oven of the traveler type showing my improvements incorporated as a part thereof.

The drawing is to be understood as being more or less schematic for the purpose of illustrating a typical or preferred form in which my invention may be made, and in said drawing similar reference characters have been employed to designate like parts wherever they appear throughout the several views.

Referring to the upper figure of the drawing it will be seen the oven comprises an elongated housing consisting of vertical front and rear walls 5 and 6, longitudinal side walls 7 connecting said vertical walls, a top wall or ceiling 8 and a base 9 from which the vertical walls arise. Horizontally disposed partitions 10, extend from the front portion of the oven to the rear portion thereof and, divide its interior into a plurality of chambers or passes 11 that communicate with each other through connecting chambers at their ends. An endless conveyor or link belt 12 carries the trays or shelves 13 in a circuitous route in the various passages through the medium of sprockets 14 or the like.

At the front of the housing the wall 5 of the oven is provided with a horizontally elongated opening 15 through which access is had to the moving trays for loading or unloading the same, and immediately back of this front wall the conveyor or link-belts and the trays carried thereby travel in a vertical direction upwardly from the bottom to the top passage of the oven. A vertical compartment 16 extends across the oven back of the front wall and provides a humidifying chamber in which the articles on the trays are subjected to the action of steam or moisture. This vertical compartment 16 communicates at its top and bottom with the respective front ends of the upper and lower compartments 11 of the oven.

The front wall 5 of the oven provides a portion of the front wall of the compartment 16 and there is a short upstanding wall 17, at the adjacent front edge of the lower horizontal partition 10, which supports a structure that extends up to the front edge of the upper partition 10 as shown. While the trays are traveling through the several compartments or passages 11 the goods are subjected to the desired heat for baking by hot-air that is discharged into the oven through the medium of elongated blowing ducts 18.

These blowing ducts 18 extend transversely across the various passages below the moving trays and are supplied with hot air from a suitable heater and blower (or fan) 19. It is preferred to re-circulate the air in the oven, and to this end a plurality of suction ducts 20 are distributed through the interior of the oven to withdraw the air and return it through the suction pipe or flue 21 and its branches to the heater and fan where said air is reheated and returned to the blowing ducts 18 through the feed pipe or flue 22 and its branches.

The vertical walls which provide the upwardly extending front compartment 16 are preferably of a hollow construction;—at least one of such walls is hollow. In the present disclosure I have shown the forward and rear walls of the chamber as of hollow construction. Immediately above the plane of the top of opening 15 there are upright box-like structures 23 and 24 which are supplied with the humidifying medium by feed pipes 25 and which discharge said medium into the vertical chamber 16 by openings 26.

The boxes 23 and 24 are preferably made of sheet metal or other suitable material shaped into hollow rectangular form and extend upwardly from the plane of the top of opening 15 to the horizontal plane of the upper partition 10. Adjacent or facing walls of the respective boxes are spaced apart slightly more than the width of the trays 13 that pass between them and said walls, which have the discharge apertures 26, also provide the longitudinal side walls of the chamber or compartment 16. The boxes extend from side wall to side wall of the housing and said side walls 7 provide the end walls of the chamber or compartment 16 and at this portion of the housing they are spaced apart slightly more than the length of the trays 13.

Thus, it will be seen, the trays in moving upwardly through the chamber or compartment 16 will clear the bounding stationary walls of said compartment. The spacing of the trays on the conveyor is such that at least two or more trays will be in transit in said vertical compartment at the same time. After a tray has passed the apertures 26 it will provide an upper wall to assist in confining the steam or humidity between itself and the next following tray which is approaching the discharge apertures. This steam charged or humidified atmosphere between two trays passing through the compartment 16 is maintained until the upper tray of a pair passes out of said compartment, whereupon the next tray becomes the retaining wall to confine the steam below it.

As each tray enters the space between the boxes it at once becomes the lower retaining wall to hold the humidified air in contact with the goods during the travel of the tray through the compartment so that the loaves of dough are subjected to or treated with moisture prior to entry into the hot drier atmosphere of the baking passages.

Figure 2:
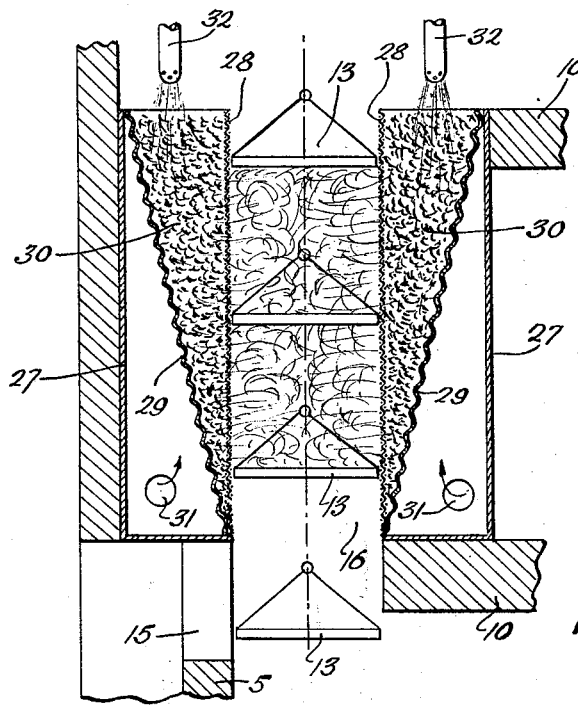
Figure 2 is a vertical sectional view showing the details of a modified structure.

Figure 2 discloses a modified structure in which a novel steam generator is shown on each side of and forming the vertical front and rear boundaries of the humidifying chamber 16.

The steam generators are in the form of elongated vertical casings similar to the boxes 23 and 24 except that they are open at the top. They preferably consist of remote vertical walls 27 and reticulated adjacent walls 28. Partitions 29 extend in inclined directions from the lower corners adjacent the apertured wall upwardly towards the remote walls and are preferably of corrugated metal as shown in Figure 2 in order to increase the heating surface thereof.

The inclined walls 29 extend from end to end of the boxes and divide each interior into side by side compartments of V-shape in cross-section. The compartments between the inclined partitions and the apertured adjacent wall are filled with metalliferous material 30 such as iron-filings or the like and the reticulations in the apertured walls are smaller than the smallest piece of metalliferous material in said compartments. The other compartments of the boxes may be designated as the heat compartment, and they taper upwardly in the manner shown so that hot air may be supplied thereto from any suitable source through the openings 31 in the ends thereof.

The hot air is of a high temperature and necessarily increases the temperature of the inclined corrugated partitions 29, which in turn conducts the heat to the iron filings. These iron filings become very hot, so much so that when moistened they will generate steam. Therefore drip-nozzles 32 are placed immediately above the open tops of the boxes close to the iron filings, such nozzles being at the ends of pipes leading from a source of fluid supply and may be valve-controlled. After the filings have become highly heated the fluid is allowed to drip from the nozzles upon the filings and it is converted into steam which passes out through the apertured walls into the humidifying chamber 16 through which the goods are traveling in an upward direction on the trays.

It is obvious that either of the generators may be dispensed with and the oven successfully operated in the manner desired. It is also obvious that different means may be employed for heating the iron filings than those herein shown. Also other materials and means may be employed for receiving the liquid or water that is converted into steam or gas.

The drawing and detailed description herein are given for the purpose of clearness of understanding only, and no unnecessary limitations are to be understood therefrom, but the claims are to be construed as broadly as permissible in view of the prior art.

What I claim is:—

1. A bake oven comprising a housing, horizontal partitions therein providing a plurality of compartments, a structure providing a vertical chamber connecting an upper and a lower compartment, means for humidifying the atmosphere in said passage, and traveling trays movable through said compartments and chamber, the said trays being of such dimensions that when moving through said chamber they provide vertically spaced barriers that confine the humidified atmosphere in said chamber.

2. In a bake oven a housing having a plurality of compartments one of which provides a vertical humidifying chamber, means for closing upper and lower portions of said chamber consisting of a plurality of movable trays that traverse said compartments and move vertically through said chamber, and means for discharging a humidifying medium into said chamber between the trays moving therethrough whereby said trays provide upper and lower barriers to confine the humidified atmosphere between them while traversing said chamber.

3. In a bake oven, means for providing a humidity chamber therein comprising a hollow box-like structure forming one of the sides of said chamber, vertical oven walls forming the ends and opposite side of said chamber, horizontally disposed leaf-carrying trays each extending from side to side and from end to end of said chamber, said trays being movable in a vertical direction through said chamber and providing superposed barriers during their transit, and means for discharging a humidifying medium from said box-like structure between said moving trays.

4. Means for providing a closed humidity chamber in a bake oven housing comprising a plurality of vertical walls surrounding said chamber, at least one of said walls being perforated, a hollow humidity receptacle alongside and further with said perforate wall, and a plurality of movable horizontal shelves traversing said chamber and being of such dimensions that they provide spaced barriers therein that withhold free escape of the humidified atmosphere from said chamber during transit.

5. Means for humidifying a portion of a bake oven comprising, in combination with an exterior housing, hollow boxlike structures extending from side to side of the housing, adjacent side walls of the respective structures being spaced apart to provide a vertical passage, means for supplying said structures with a humidifying medium and discharging the same into said passage, conveyors movable vertically through said passage, and trays supported by said conveyors and movable in superposed relation to each other through said passage and being of such dimensions that they provide top and bottom barriers between which the humidifying medium is discharged and confined during transit of the trays through the passage.

6. A bake oven comprising a housing, horizontal partitions dividing the interior into a plurality of longitudinal passages communicating in series with each other, vertical walls extending across the oven adjacent the front of the housing and providing a vertically disposed humidity chamber that communicates with upper and lower passages, certain walls of the chamber being of boxlike formation and adapted to discharge a humidifying medium into said chamber, conveyor means passing initially through said chamber and subsequently through said passages, said conveyor means including trays each of which is of such dimensions as to substantially fill said chamber in a transverse plane to provide pockets in said chamber between successive trays, and means for heating said passages.

7. A bake oven comprising a housing, horizontal partitions dividing the interior into a plurality of longitudinal passages communicating in series with each other, transverse vertical walls adjacent the front of the housing that are spaced from each other to provide boxlike structures, said boxlike structures being separated from each other to provide a vertical intermediate chamber communicating with said series of passages, means for discharging a humidifying medium from said boxlike structures into said intermediate chamber, endless conveyors traversing said passages and chamber, and trays supported by said conveyors and being of such dimensions that during their vertical travel through said intermediate chamber they provide horizontal barriers between the vertical walls of said chamber whereby to confine the humidified atmosphere therein between adjacent trays.

8. Means for providing a humidifying portion of a bake oven housing comprising spaced side by side boxlike structures disposed vertically adjacent an end of the housing, facing walls of said structures being apertured, means for charging said structures with a humidifying medium, and a plurality of vertically movable trays of such a size as to extend across the space between the boxlike structures and provide pockets between adjacent trays to confine the humidified atmosphere therein during transit of the trays through the chamber between said boxlike structures.

Signed at Chicago, in the county of Cook, and State of Illinois, this 4th day of March, 1931.

FRIEDRICH A. HOPPE.